(12) United States Patent
Braganza et al.

(10) Patent No.: US 8,958,048 B2
(45) Date of Patent: Feb. 17, 2015

(54) MULTI-FUNCTIONAL GASKET FOR ELECTROOPTICAL DISPLAY

(75) Inventors: Clinton Braganza, Kent, OH (US);
Mathew Bowser, Hubbard, OH (US);
John Krinock, North Canton, OH (US);
Forrest Nicholson, Kent, OH (US)

(73) Assignee: Kent Displays Incorporated, Kent, OH (US)

( * ) Notice: Subject to any disclaimer, the term of this patent is extended or adjusted under 35 U.S.C. 154(b) by 218 days.

(21) Appl. No.: 13/549,907

(22) Filed: Jul. 16, 2012

(65) Prior Publication Data
US 2014/0016076 A1    Jan. 16, 2014

(51) Int. Cl.
*G02F 1/1335*    (2006.01)
*G02F 1/1333*    (2006.01)

(52) U.S. Cl.
CPC ................. *G02F 1/133351* (2013.01)
USPC ......................................... 349/187

(58) Field of Classification Search
CPC ................... G02F 1/1341; G02F 1/133351
USPC ......................................... 349/187
See application file for complete search history.

(56) References Cited

U.S. PATENT DOCUMENTS

| 5,251,048 A | 10/1993 | Doane et al. |
| 5,427,828 A * | 6/1995 | Park ............................. 428/1.62 |
| 5,644,330 A | 7/1997 | Catchpole et al. |
| 5,748,277 A | 5/1998 | Huang et al. |
| 5,889,566 A | 3/1999 | Wu et al. |
| 6,133,895 A | 10/2000 | Huang |
| 7,023,409 B2 | 4/2006 | Blackson et al. |
| 2007/0085837 A1 | 4/2007 | Ricks et al. |
| 2007/0277659 A1 | 12/2007 | Schneider et al. |
| 2009/0153756 A1 | 6/2009 | Roberts et al. |
| 2009/0303427 A1 * | 12/2009 | Kondo et al. ................. 349/153 |

* cited by examiner

*Primary Examiner* — Phu Vu
(74) *Attorney, Agent, or Firm* — Pearne & Gordon LLP (57) ABSTRACT

A method of making an electrooptical display comprises providing a first substrate and a second substrate. A first layer of electrically conductive material is disposed on the first substrate and a second layer of electrically conductive material is disposed on the second substrate. A bead of adhesive gasket material is formed over the first substrate. Light modulating material is flowed onto the first layer of electrically conductive material and over the bead. The second substrate is positioned in contact with the light modulating material in proximity to the first substrate. The gasket material is cured.

27 Claims, 9 Drawing Sheets

MULTI-FUNCTIONAL GASKET FOR ELECTROOPTICAL DISPLAY

FIELD OF THE INVENTION

This disclosure pertains to electronic displays including light modulating material, for example, liquid crystal displays, and unique processes of using an adhesive gasket material for sealing the light modulating material in the display.

BACKGROUND OF THE INVENTION

Flexible displays can benefit from being sealed at the edges. An edge seal that seals the top and bottom substrates of a flexible display provides protection for the display from delamination, environmental contaminants and leakage of display materials such as liquid crystal. The edge seal can either be an adhesive or a laser weld of the display edge. The adhesive can either be applied internally within the display substrates or externally.

Currently, flexible displays can be properly sealed during the laser singulation process where the display panel is separated from the web line. According to U.S. Patent Application Publication 2007-0277659, utilizing and controlling the infra-red heat generated by a laser during display singulation has been shown to sufficiently seal the display by welding the top and bottom substrates in the presence of liquid crystal between the two plastic substrates.

In some situations such as when a portion of the bottom or top substrate has to be exposed such as in the creation of a ledge, this process cannot be used, and is supplemented by other processes. One such process is the application of an external adhesive after the ledge is exposed. In this process, the regions of the display closest to the ledges are prone to delamination. In addition, applying the gasket externally requires the displays to be singulated prior to sealing, this leads to increased processing time and yield losses due to delamination prior to gasket application.

In some cases using a method such as that described in U.S. Patent Publication 2009-0153756, an internal gasket is present before liquid crystal is filled between the substrates. Utilizing this method only seals two edges of the display.

BRIEF DESCRIPTION OF THE INVENTION

This disclosure features methods of creating an internal gasket for electrooptical displays that are also compatible with roll to roll manufacturing processes. It also features the multifunctional utility of this gasket.

One aspect features a method of laminating a light modulating material (e.g., a liquid crystal dispersion material) between two display substrates in the presence of an adhesive gasket material while controlling the laminate thickness. Each substrate is coated with a layer of electrically conductive material. The liquid crystal dispersion material containing spacers is laminated between the two substrates, with the bottom substrate having the desired gasket pattern, ensuring that the top substrate only contacts the gasket material after the dispersion material has advanced. This ensures that the adhesive seal is not breached by the flow of the dispersion material.

Another aspect features a method ensuring that the gasket does not interact, lose its adhesive properties or get solubilized by the dispersion material during the lamination and cure process. To implement this, adhesives with high flexibility, high peel strength, needle dispensability, and the ability to be partially cured (B-staged) are chosen. In addition, if possible, the liquid crystal material is dewet by the gasket material after B-Staging. In this way, during the lamination process the dispersion materials will not affect the adhesive properties of the gasket when contacting the gasket.

Another aspect features a method of ensuring that the display dispersion material remains in the active region, despite the presence of de-wetting surface tension forces caused by the desired immiscibility of the gasket and dispersion materials. The gasket forms a closed loop around the active region or region in which the liquid crystal material is disposed. This prevents the dispersion materials from escaping before the dispersion can fully cure. This is especially useful in smaller displays where material loss from de-wetting can be significant.

The gasket material can be used as an electrical insulator to reduce top to bottom shorts at the display edges in displays that do not use patterned substrates such as the writing tablet and electronic skin sold by Kent Displays Inc.

The gasket can be used as a protective buffer between substrates when using either a laser or die cutter after display lamination to form ledges.

The gasket can be used as a means to ruggedize large flexible displays when it is applied not only to the perimeter of the display, but also within the active area.

If an internal gasket dispensed prior to lamination in any pattern is used, the display can be protected on the whole perimeter and wherever ruggedization or sealing is required. This gasket would be compatible with roll-to-roll processing. This internal gasket would also reduce yield losses due to delamination because it would already be present during display handling steps such as cleaning, substrate removal for ledge creation (ledging) and electronic bonding.

This invention addresses the problems with utilizing and implementing an internal gasket that is present in the path of liquid crystal flow during the lamination of the display. The problems that need addressing have to do with the reduced adhesion due to the micron spacing between the substrates and the contamination of the adhesive material by the liquid crystal material.

Figure 1:
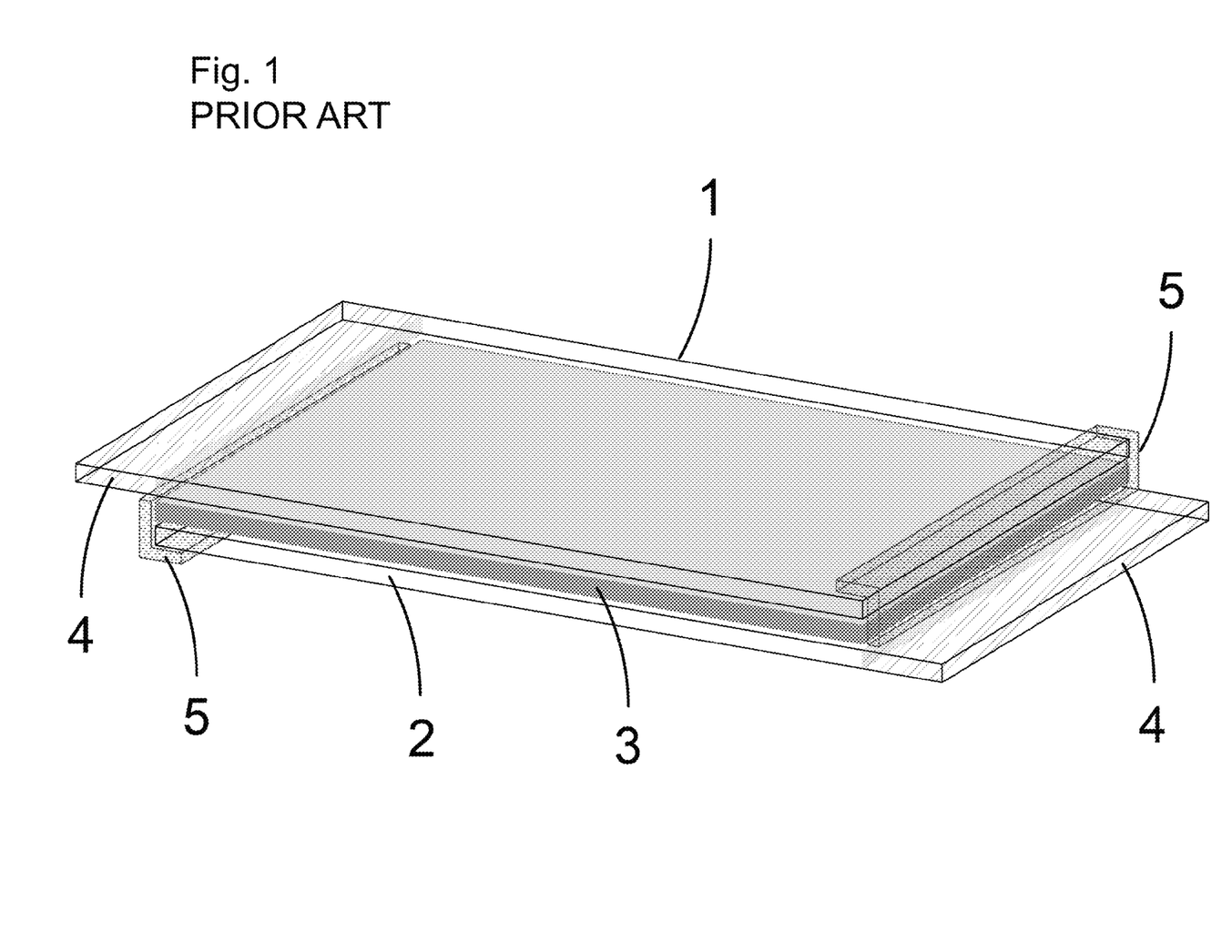
FIG. 1: Drawing showing an external adhesive applied to the display ledges (Prior Art)
Figure 2A:
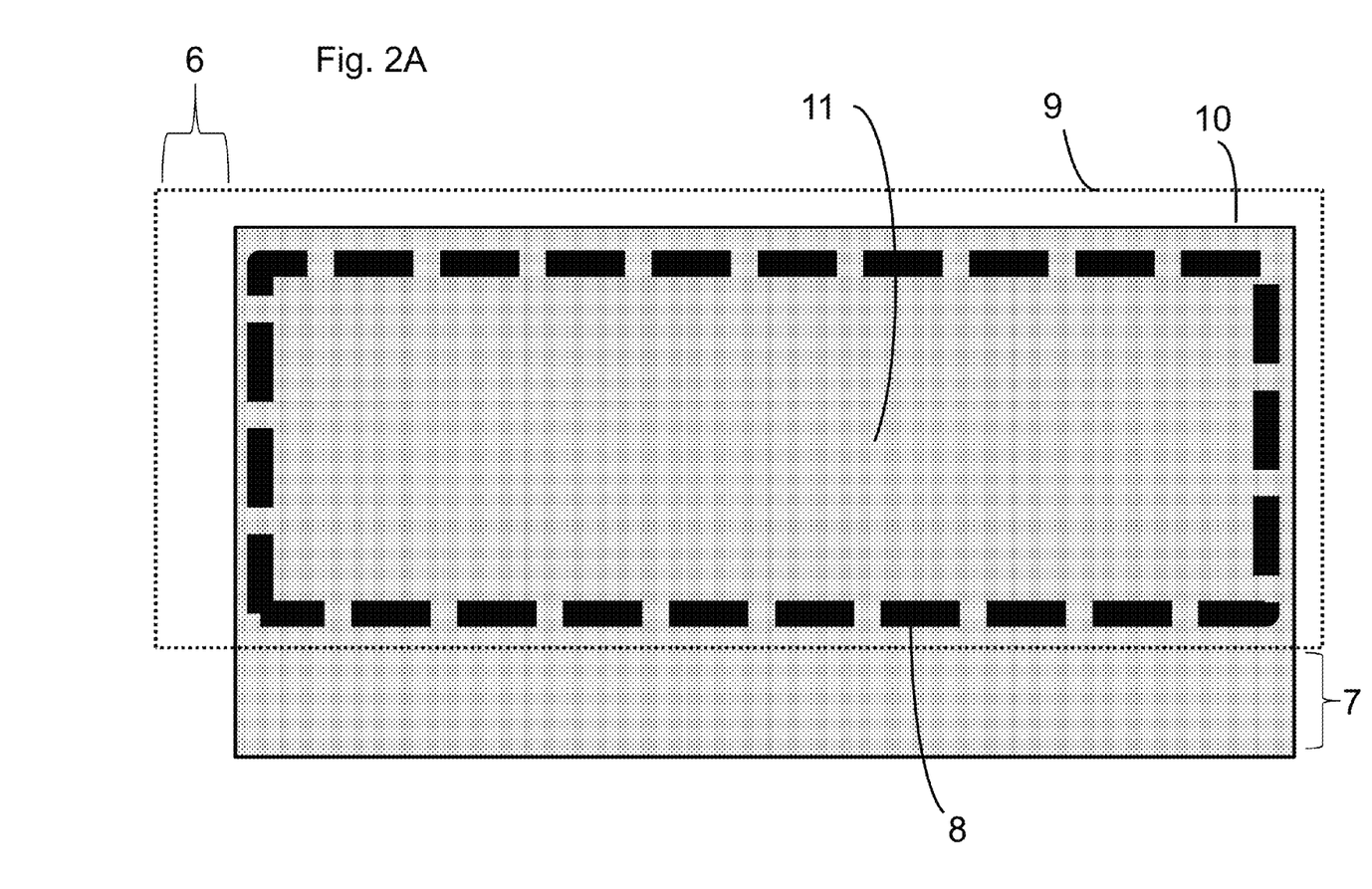
FIG. 2A: Top plan view of a flexible display with an internal gasket between the top and bottom substrates placed on the perimeter of the display.
Figures 2B, 2C:
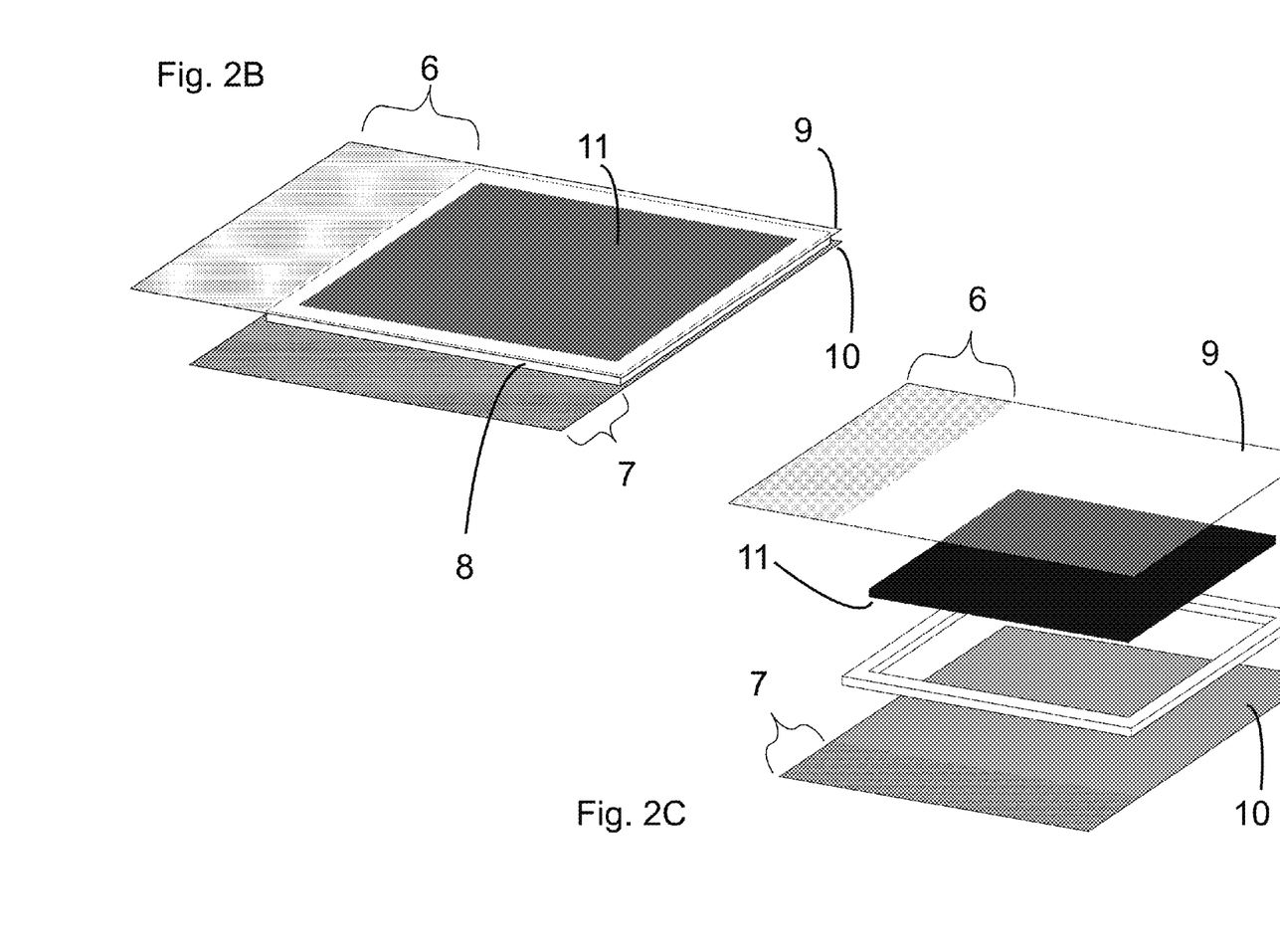
FIG. 2B and FIG. 2C: perspective view and exploded perspective view, respectively, of the display shown in FIG. 2A.

Here an internal gasket (i.e., a gasket that is disposed inside the perimeter of the substrates, for example, in FIGS. 2A-C) and gasket design that is compatible with the flexible display manufacturing process and materials are described. This gasket eliminates the need for an external adhesive at the ledge side (e.g., adhesive 5 of FIG. 1) and also reduces the chance of delamination during the ledging process. The gasket, when applied to the whole perimeter of the display, would make the display more robust for applications such as the eCard display by Kent Displays Inc. in which a liquid crystal display is mounted to a card such as a credit card.

Additionally, this gasket can also be used to reduce top to bottom shorts and environmental failures due to shorts at the singulation edge in displays with unpatterned electrodes such as the writing tablet and electronic skins.

Finally, this internal gasket that is compatible with flexible displays made with liquid crystal polymer dispersions can be used as a material buffer between substrates for laser or die cuts during the ledging process.

A first embodiment of this disclosure features a method of making an electrooptical display comprising providing a first substrate and a second substrate, a first layer of electrically conductive material disposed on the first substrate and a second layer of electrically conductive material disposed on the second substrate. A bead of adhesive gasket material is formed over the first substrate (e.g., on the first layer of electrically conductive material or on the first substrate if there is no electrically conductive material on the first substrate in the region of the gasket). Light modulating material is flowed onto the first layer of electrically conductive material and over the bead. The light modulating material is optionally dewetted from the gasket material in this and in all embodiments of the disclosure. The second substrate is positioned in contact with the light modulating material in proximity to the first substrate. The gasket material is cured.

Referring to specific features of the first embodiment (as well as to any of the other embodiments discussed below), the first substrate and the first electrically conductive layer can be transparent (e.g., when the first substrate is closer to the viewer than the second substrate). The light modulating material can be a liquid crystal material, for example, cholesteric liquid crystal material. The cholesteric liquid crystal material can be dispersed in polymer. At least one of the first substrate and the second substrate can be comprised of flexible polymer.

The gasket material can be a partially curable or B stageable material. The method of the first embodiment can include the step of partially curing the gasket material before contact with the light modulating material and then after the second substrate is put in position, providing the gasket material with a final cure.

A closed loop of a continuous bead can completely enclose a region between the first and second substrates. An inner bead of the gasket material can be provided inside the region. The inner bead has light modulating material in proximity to or in contact with two sides thereof.

The method can include the step of cutting through one of the first or second substrates near an area of a ledge where one of the first substrate or the second substrate overhangs the other (containing exposed electrically conductive material at the ledge). The cutting can occur outside of the gasket material. Alternatively, the cutting can occur within the gasket material, such as when laser singulation is performed.

Still further, the light modulating material can include spacers that set a gap between the first and second electrically conductive layers. The first and second substrates can be moved together to compress the gasket until the first electrically conductive layer and the second electrically conductive layer contact the spacers. Then the gasket can be given a final cure. The cutting occurs after this step.

A second embodiment features a method of making a liquid crystal display. A sheet of a first substrate is moved along a conveyor. The first substrate includes a first layer of electrically conductive material formed thereon. A plurality of spaced apart beads of adhesive gasket material is formed over the first substrate so that each of the beads of the gasket material forms an area that is enclosed by the bead. Liquid crystal material is flowed into each area in contact with the first layer of electrically conductive material and over the gasket material. A sheet of a second substrate is moved in contact with the liquid crystal material in proximity to the first substrate. The second substrate includes a second layer of electrically conductive material formed thereon. The liquid crystal material includes spacers that set a gap between the first and second electrically conductive layers. At least one roller is pressed against at least one of the first substrate and the second substrate to move the first substrate and the second substrate together and to compress the gasket material of each of the beads until the first electrically conductive layer and the second electrically conductive layer contact the spacers. The gasket material is cured. The first substrate and the second substrate are cut through at non-ledge portions of a plurality of the displays. One of the first substrate or the second substrate, but not the other, is cut through near an area of each ledge of each of the displays.

A third embodiment features a liquid crystal display including a first substrate and a second substrate that are spaced apart from each other. A first layer of electrically conductive material is disposed on the first substrate and a second layer of electrically conductive material is disposed on the second substrate. The liquid crystal material is disposed between the first substrate and the second substrate. A perimeter gasket formed of gasket adhesive material is disposed at a perimeter of the display and between the first substrate and the second substrate in contact with the first electrically conductive layer and the second electrically conductive layer. The perimeter gasket has one side in proximity to or in contact with the liquid crystal material. The perimeter gasket seals the liquid crystal material in the display. An inner gasket formed of adhesive gasket material is located between the substrates such that two sides of the inner gasket are in proximity to or in contact with the liquid crystal material. The inner gasket can be used when the display is large such as a "whiteboard" type of writing tablet display which would benefit from the increased strength provided by using the inner gasket.

A fourth embodiment of this disclosure features a liquid crystal display including a first substrate and a second substrate that are spaced apart from each other. A first layer of electrically conductive material is disposed on the first substrate and a second layer of electrically conductive material is disposed on the second substrate. Liquid crystal material is disposed between the first and second substrates. A gasket formed of adhesive gasket material is disposed at a perimeter of the display between the substrates (e.g., in contact with the first and second electrically conductive layers). The gasket has one side in proximity to or in contact with the liquid crystal material. The gasket seals the liquid crystal material in the display. The gasket completely encloses the liquid crystal material as one continuous bead forming a closed loop. There is no open port for filling liquid crystal material, or open port that has been plugged, in the gasket.

A fifth embodiment features a method of making a liquid crystal display including the step of providing a first substrate, a first layer of electrically conductive material being disposed on the first substrate. A bead of adhesive gasket material is formed over the first substrate to form an area that is enclosed by the gasket material. Liquid crystal material is flowed into the area in contact with the first layer of electrically conductive material and over the bead. A second substrate is provided, a second layer of electrically conductive material being disposed on the second substrate. The second substrate is positioned in contact with the light modulating material in proximity to the first substrate. The gasket material is cured. The first substrate, the second substrate and the gasket material are cut through at non-ledge portions at a perimeter of the display. Cuts through one of the first and second substrates are formed at each of ledge portions of the display. The other of the first substrate and the second substrate are uncut at each of the ledge portions of the display. The cuts are disposed in alignment with the gasket material or outside of the gasket material. The cutting steps and presence of the gasket material prevent electrical shorts between the first layer of electrically conductive material and the second layer of electrically conductive material. A cut portion of one of the first substrate and the second substrate is removed at each of the ledge portions.

A sixth embodiment features a method of making a liquid crystal display including providing a first substrate, a first layer of electrically conductive material being disposed on the first substrate. A bead of adhesive gasket material is formed over the first substrate. The liquid crystal material is flowed into contact with the first layer of electrically conductive material and over the gasket material. A second substrate is provided, a second layer of electrically conductive material being disposed on the second substrate. The second substrate is positioned in contact with the light modulating material in proximity with the first substrate. The gasket material is cured. The first substrate and the second substrate are cut through at non-ledge portions at a perimeter of the display. Additional cuts are made through only one of the first substrate and the second substrate at each of ledge portions of the display. The other of the first substrate and the second substrate are not cut at each of the ledge portions of the display. The cuts extend into the gasket material as a buffer to prevent cutting through the other of the first substrate and the second substrate. The cut one of the first substrate and the second substrate is removed at each of the ledge portions.

Referring to specific features of the sixth embodiment, laser singulating or die cutting of the display can be carried out at the non-ledge portions of the display through the first substrate and the second substrate. The laser singulating can take place through the gasket material.

For a multi layer liquid crystal display, the ledges will be staggered for connection simplicity. In addition the ledging will in some cases, for example, for the bottom most display, cut through two layers of gasket material so that the bottom most ledge can be exposed. Each of the cells in a stacked display can be made separately as described herein and stacked.

ADVANTAGES OF THE INVENTION

The gasket provides a complete seal along the whole perimeter of each of the displays that is compatible with roll-to-roll processing. The gasket is applied at the beginning of the process so that there is no need for processing of individual displays after singulation.

It is typically an internal gasket, in that it is contained within the substrates. Therefore, it prevents delamination and edge top to bottom shorts right away, thus increasing yield.

The gasket is compatible with the liquid crystal dispersion raw materials such that it still has adhesive properties after the dispersion material contacts it.

The gasket is compatible with the liquid crystal dispersion in that it is inert with respect to the dispersion.

The gasket retains its shape after display building processes such as lamination.

The gasket is compatible with flexible polymer substrates.

The gasket can be used to seal displays at the ledges, even displays with multiple ledges such as a multi layered display.

The gasket works as a buffer between substrates that enables the use of a die cutter or a laser to cut a single substrate at a time to create ledges.

In multi layer displays the gasket will eliminate unwanted mixing of the liquid crystal between the display layers at the edges.

In addition to a perimeter gasket, an inner support gasket wall can be used to ruggedize a flexible display, for example a large white board similar to but larger in size than a Boogie Board® writing tablet as sold by Kent Displays Inc.

The gasket can be used for sealing Boogie Board® writing tablets as sold by Kent Displays Inc.

The gasket can be used for sealing Skin Flik™ electronic skin displays as sold by Kent Displays Inc.

The gasket can be used to reduce top to bottom shorts along the perimeter of the display.

DETAILED DESCRIPTION OF THE INVENTION

Referring to FIG. 1, the perimeter of Reflex® displays sold by Kent Displays Inc. are sealed by using heat generated from a laser to melt the top substrates 1 and bottom substrate 2 to the seal in the liquid crystal 3. When there are ledges 4, an external adhesive 5 is used instead to seal that portion of the display. This process works very well when the ledges are not a significant portion of the perimeter of the display.

In some displays a major portion of the perimeter of the display is taken up by the top ledge 6 and bottom ledge 7, as shown in FIGS. 2A-C. In these cases other sealing methods are suitably used, as the laser heat sealing could cut off the ledge or damage the conductor of the ledge. A bead 8 of gasket material (a gasket) is placed in between the top substrate 9 and bottom substrate 10, each of which is coated with a layer of electrically conductive material. The gasket is present during the lamination of the liquid crystal dispersion. In this case the gasket is placed along the display perimeter so that after lamination it contains the dispersion 11 in between the substrates 9 and 10. Although the gasket 8 is shown in dotted lines in FIG. 2A, it should be appreciated that the gasket is a continuous bead as shown in FIGS. 2B and 2C.

It will be appreciated that all displays disclosed herein can include suitable electrical interconnects electrically connected to the exposed electrically conductive layers at each ledge and drive electronics as disclosed in U.S. Pat. Nos. 5,251,048; 5,644,330; 5,748,277; 5,889,566; 6,133,895 and 7,023,409, all of which are incorporated herein by reference in their entireties.

Figure 3A:
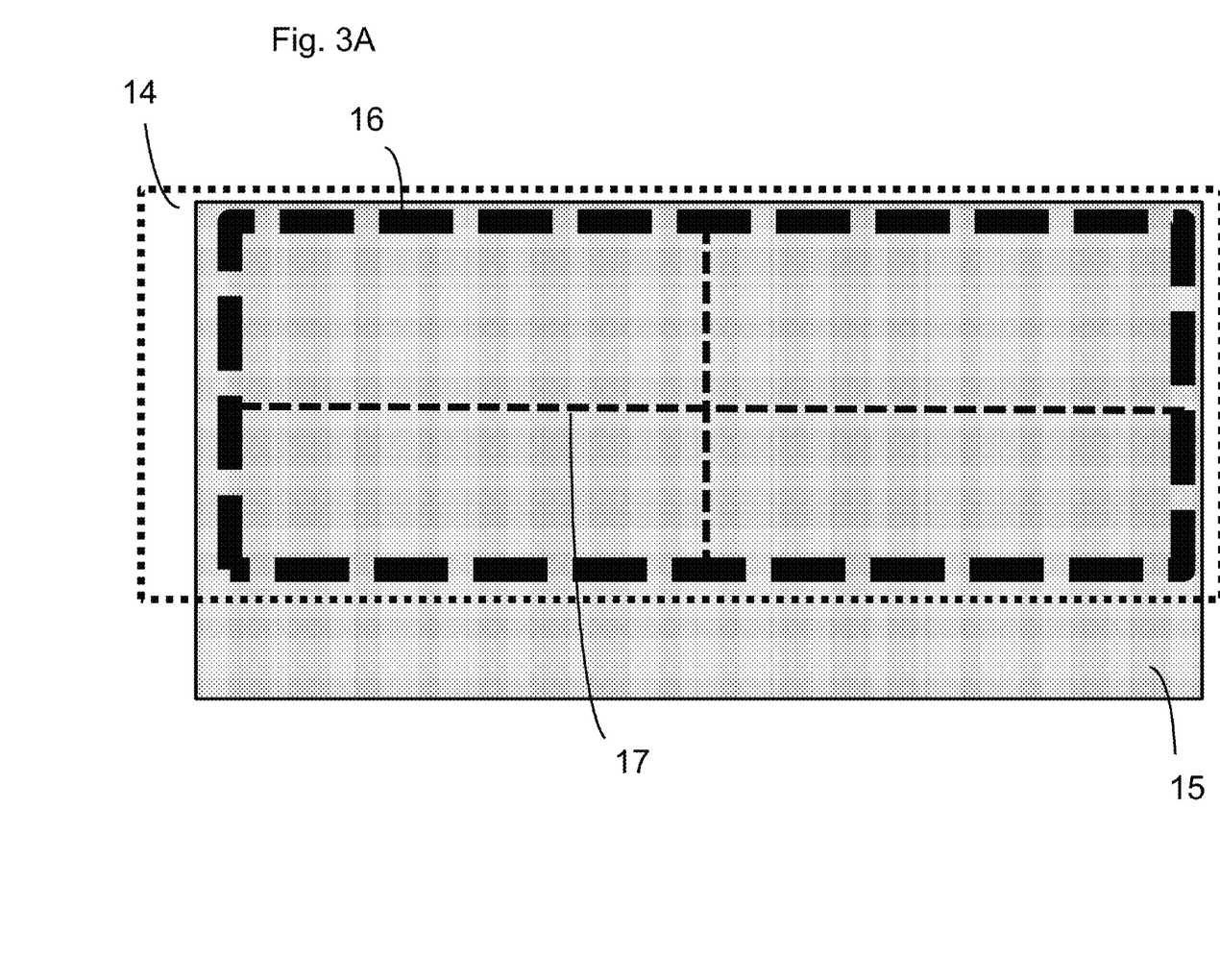
FIG. 3A: Top plan view of a flexible display with an internal gasket between the top and bottom substrates placed on the perimeter of the display and in the active area (i.e., an inner gasket).
Figures 3B, 3C:
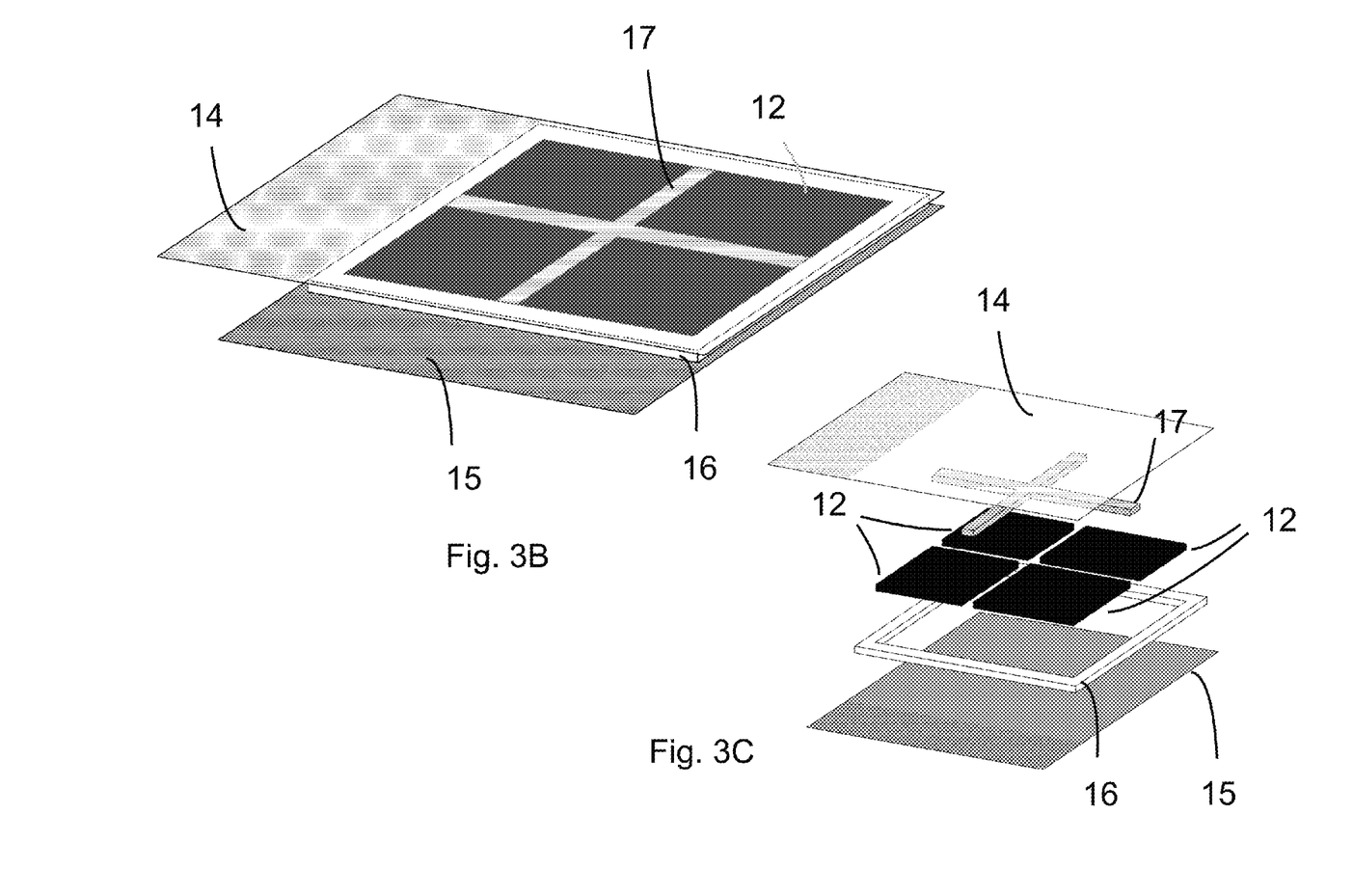
FIG. 3B and FIG. 3C: perspective view and exploded perspective view, respectively, of the display of FIG. 3A.

In some cases as in FIG. 3A-C, the perimeter gasket 16 is placed in between the top substrate 14 and bottom substrate 15 and is not only used in the perimeter of the display as shown by the square 16, but it is also an inner gasket 17 used within an active area running through the liquid crystal 12 as shown by the crossing, "plus" shaped lines to ruggedize a display panel such as a large Boogie Board ® writing tablet or Skin Flik™ eskin as sold by Kent Displays Inc. The substrates of FIGS. 3A-3C each include a layer of electrically conductive material formed thereon.

For the gasket to be present during the lamination process the adhesive should not get deformed or lose its adhesive strength. One way to achieve this is by choosing an adhesive that can be partially cured (or B-staged) so that it retains its shape and adhesive properties during the lamination process. Examples of such adhesives are DELO PHOTOBOND AD494, DELO DUALBOND family of adhesives and 3M™ UV B-Stage Adhesive 1051. Furthermore, the dispersion materials may be selected so as to de-wet from the partially cured or B-staged adhesive; this will ensure that the adhesive has good contact with the plane to be adhered.

Figure 4:
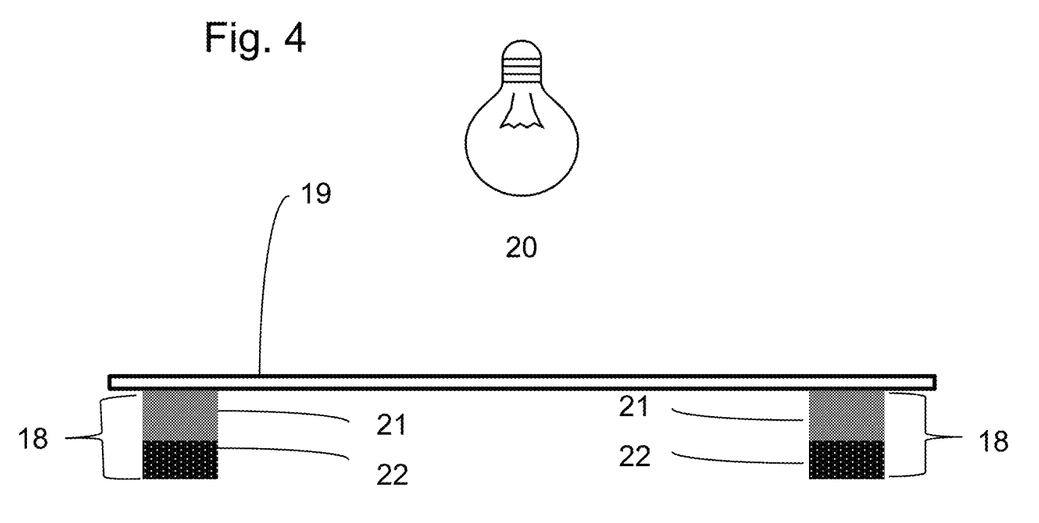
FIG. 4: Figure showing the side view of a pre-tacked internal gasket before the liquid crystal dispersion is applied.

FIG. 4 shows a further enhancement where the gasket 18 adhesive, after being dispensed on a substrate 19 is cured from the substrate side 20. In this manner, the adhesive is mostly cured at the side closest to the light source 21 and partially cured (or B-staged) at the top gasket portion 22, giving the gasket both mechanical integrity and adhesive properties. It should be appreciated that the substrate need not be oriented so that the gasket faces down as shown in the figure when irradiated. Additionally, the top gasket portion 22 distal from the light source will repel the dispersion material so that it can make good contact with the opposite substrate. Because the adhesive repels the dispersion material, the gasket forms a closed loop around the display active region 11 (FIG. 2C) so that the dispersion material does not escape due to surface tension forces from the active region.

After the partial cure or B-staging, the dispersion material is laminated between the gasket imprinted substrate and a top substrate that may or may not have a matching gasket pattern. After a final UV cure, the result is a flexible display with an internal gasket that is ready for singulation by any tool such as a laser or die cutter.

Figure 5A:
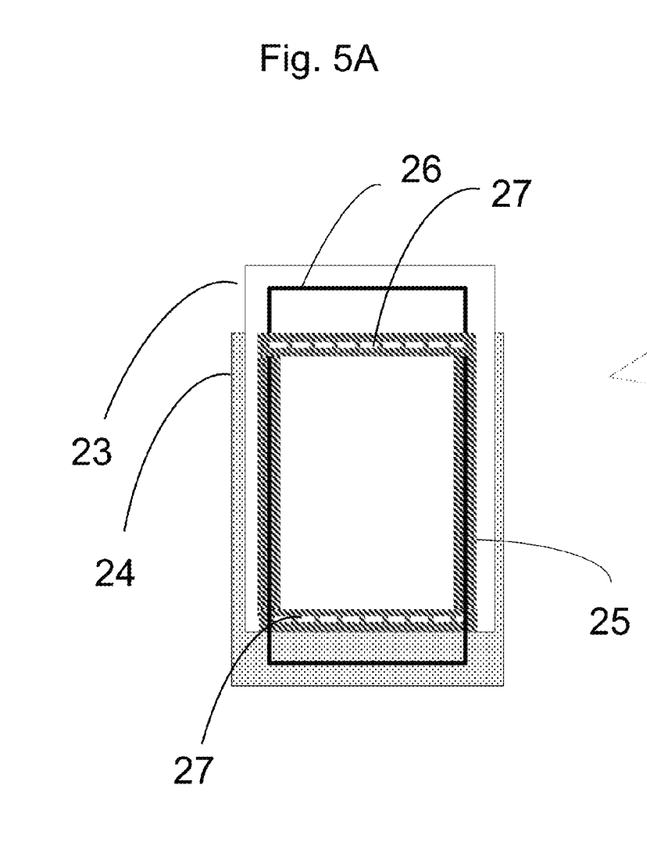
FIG. 5A and FIG. 5B: Top plan and perspective side view, respectively, of a flexible display showing the location of the gasket in relation to the display ledge and singulation cuts.
Figure 5B:
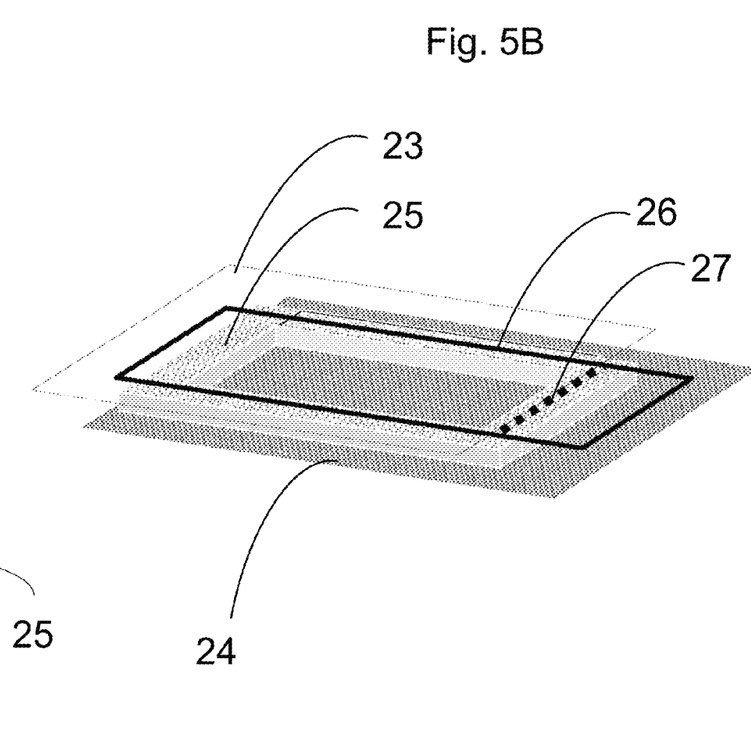

In addition to adhesive properties, this internal gasket can be used for other purposes. Referring to FIGS. 5A and 5B, the gasket can be used to reduce electrical shorts between the top substrate 23 and bottom substrate 24 in displays with no patterned conductors such as the writing tablet or eskin displays.—Most of the top to bottom shorts originate from the display perimeter. By placing the gasket 25 in a pattern so that it is the middle of the singulation 26 and ledge edge 27, it provides a dielectric layer that will reduce top to bottom shorts in this region.

Figure 6A:
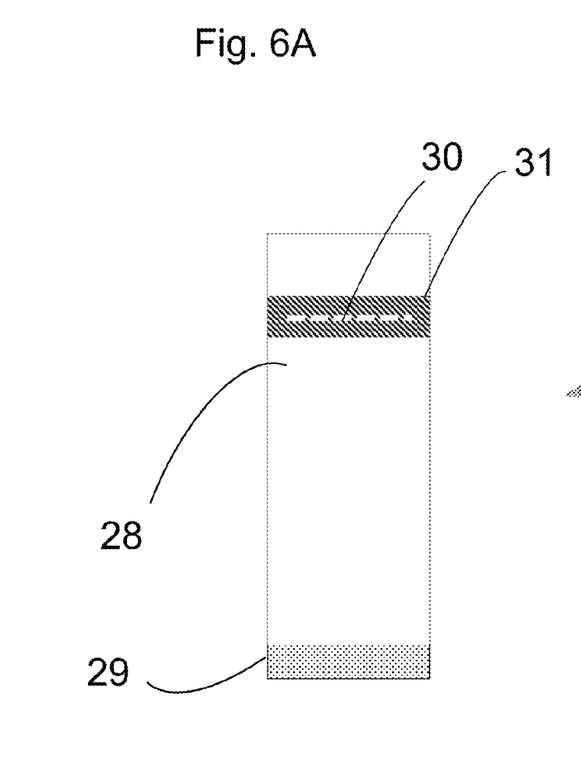
FIG. 6A and FIG. 6B: Top plan and perspective side view, respectively, of a flexible display showing the location of the gasket to be used as a buffer for a post lamination substrate cut.
Figure 6B:
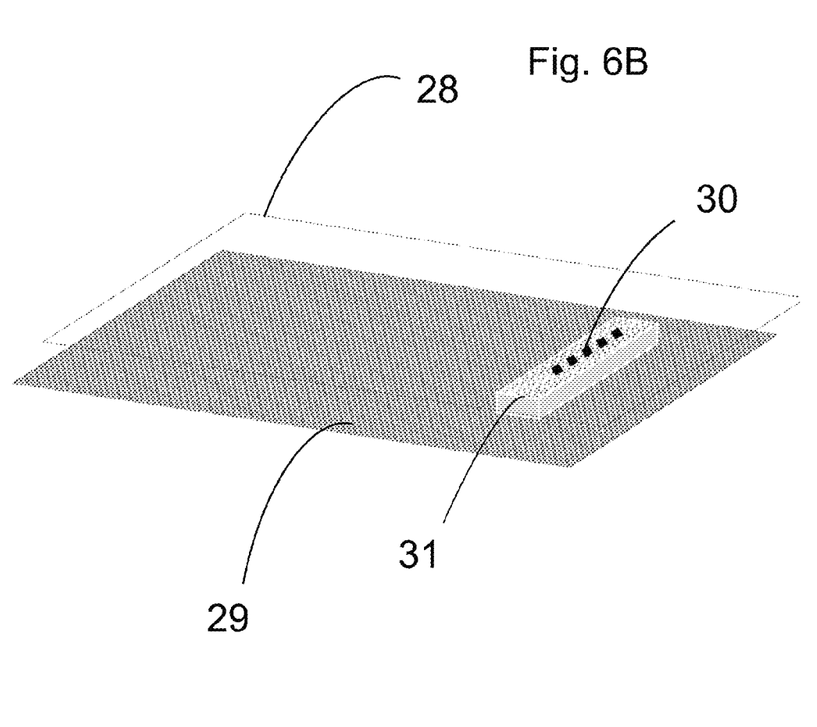

In FIGS. 6A and 6B, yet another use for a gasket is shown. When the top substrate 28 and bottom substrate 29 are laminated, a portion of the top and bottom substrate needs to be exposed so that electrical connections may be made; this exposed area is called a ledge. Normally, for example, to expose the bottom ledge, a cut is made to the top substrate near the location of the ledge edge 30 to peel off the cut portion of the top substrate (i.e., the cut top substrate piece to the right of the ledge edge 30 in FIG. 6B). With the gasket 31 in place near the location of the cut 30, it will act as a buffer protecting the bottom substrate from damage when the cut is made through the top substrate at the ledge. The substrates of the displays shown in FIGS. 5A, 5B and 6A and 6B each include a layer of electrically conductive material formed thereon.

This disclosure will now provide the following examples, which should not be used to limit the scope of the invention as defined in the claims.

Example: 1

A program is written to dispense a bead of the gasket material on the bottom substrate of a flexible graphical display panel array. The gasket 8 is dispensed as shown in FIGS. 2A-C using a Camalot 1818 adhesive dispenser with a 27 gauge needle attached. Note that the gasket is located in regions, for example, the ledges 6, 7 where previously it was difficult to seal. The gasket material used in this case is DELO PHOTOBOND AD494. Referring to FIGS. 5A and B, the gasket material is dispensed so that it is in the middle of the singulation path 26 and ledge edges 27. Note that the gasket forms a closed loop around the active area; this will help to keep the liquid crystal dispersion material in the active region after lamination, despite materials incompatibility. If this is not done, the dispersion material escapes during the cure process.

After dispensing the material is B-staged by UV curing through the substrate 19 as illustrated in FIG. 4, so that the adhesive material 21 closest to the substrate 19 cures more than the top gasket portion 22, hence giving both a gasket with a defined shape and remaining tack on the top. This is done because it is difficult to balance the UV dose needed to retain the gasket shape and the dose needed for B staging when curing from the dispense side.

Figure 7:
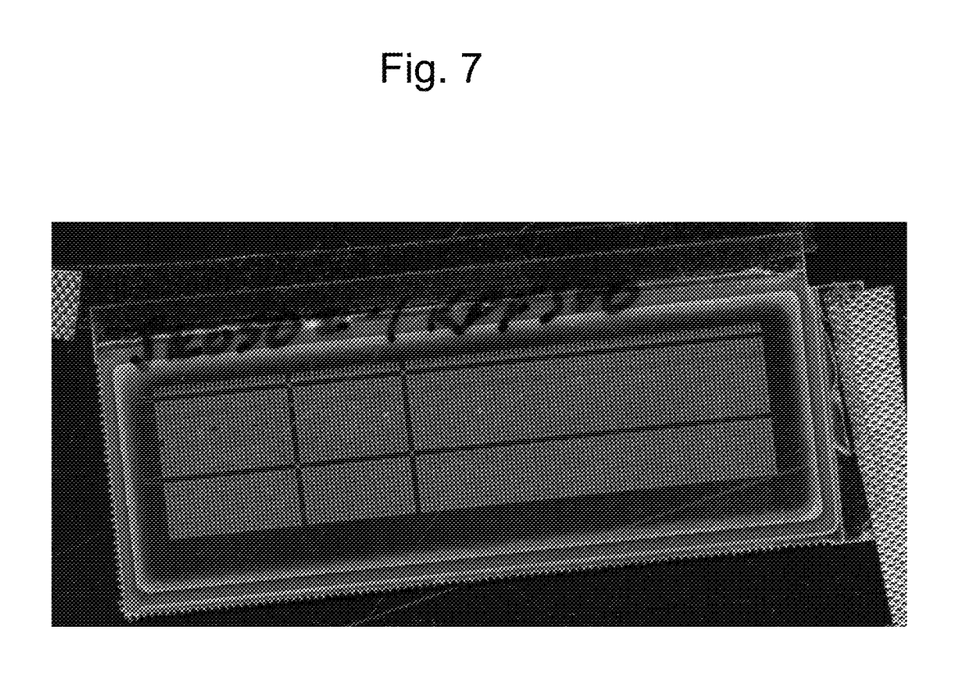
FIG. 7: Photograph of a sealed display used in Example 1.

At this point the dispersion material does not wet the partially cured AD494 gasket material. The substrate with the gasket is placed with the gasket facing up; with a bead of the liquid crystal dispersion material containing spacers dispensed at the lamination leading edge. During lamination, care is taken to let the top substrate only touch the tops of the gasket after the liquid crystal material has flowed over the gasket. The lamination is done a second time with a heavier roller to set the cell gap (to compress the gasket so that both of the electrically conductive layers contact the spacers), after which the display is cured for 20 minutes at low irradiance UV so that the liquid crystal dispersion can phase separate. After this step the gasket is given 15 seconds of high irradiance UV for complete cure, after which the displays are singulated and ledged. The result is a display photographed in FIG. 7, with an internal gasket that keeps out of the active area and reduces delamination caused by a weak or no edge seal. After cure there is no material interaction between the liquid crystal and the gasket.

Example: 2

Referring to FIGS. 5A and 5B, the same gasket material 25 is dispensed on an unpatterned conductive polymer substrate 24 in the location of the ledges and display perimeter. The gasket dispense pattern is such that it follows the singulation pattern 26 of either the eskin or writing tablet except near the ledge edge, where it follows the line 27. After performing the same lamination and cure steps described above, the display is singulated right over the gasket pattern, except by the ledges where only one of the substrates are cut. After ledging, the result is an unpatterned display with no top to bottom shorts due to edge shorting.

Example: 3

Referring to FIGS. 6A and 6B, the gasket material 31 was dispensed on a flexible display substrate 29. The location of the gasket is chosen to coincide with the middle of the desired location of the ledge edge 30. After performing the same lamination and cure steps described above, a laser was used to cut the top substrate at the ledge edge right over the gasket pattern so that the bottom ledge could be exposed. Here the gasket is only used as a ledging buffer, the rest of the perimeter can be sealed by a laser or other means.

What is claimed is:

1. A method of making an electrooptical display comprising the steps of:
    providing a first substrate and a second substrate, a first layer of electrically conductive material disposed on said first substrate and a second layer of electrically conductive material disposed on said second substrate;
    forming a bead of adhesive gasket material over said first substrate;
    flowing light modulating material onto said first layer of electrically conductive material and over said bead;
    positioning said second substrate in contact with said light modulating material in proximity to said first substrate; and
    curing said gasket material.

2. The method of claim 1 wherein said first substrate and said first electrically conductive layer are transparent.

3. The method of claim 1 wherein said light modulating material is a liquid crystal material.

4. The method of claim 3 wherein said liquid crystal material is cholesteric liquid crystal material.

5. The method of claim 4 wherein said cholesteric liquid crystal material is dispersed in polymer.

6. The method of claim 1 wherein at least one of said first substrate and said second substrate is comprised of flexible polymer.

7. The method of claim 1 wherein said gasket material is a partially cureable or B stageable material.

8. A method of making an electrooptical display comprising the steps of:
providing a first substrate and a second substrate, a first layer of electrically conductive material disposed on said first substrate and a second layer of electrically conductive material disposed on said second substrate;
forming a bead of adhesive gasket material over said first substrate, wherein said gasket material is a partially cureable or B stageable material;
partially curing said gasket material; flowing light modulating material onto said first layer of electrically conductive material and over said bead in contact with said partially cured gasket material;
positioning said second substrate in contact with said light modulating material and said partially cured gasket material in proximity to said first substrate; and
providing said gasket material with a final cure.

9. The method of claim 1 wherein a closed loop of a continuous said bead completely encloses a region between said first substrate and said second substrate.

10. A method of making an electrooptical display comprising the steps of:
providing a first substrate and a second substrate, a first layer of electrically conductive material disposed on said first substrate and a second layer of electrically conductive material disposed on said second substrate;
forming a bead of adhesive gasket material over said first substrate, wherein a closed loop of a continuous said bead completely encloses a region between said first substrate and said second substrate, and providing an inner bead of said gasket material inside said region;
flowing light modulating material onto said first layer of electrically conductive material and over said bead; said inner bead having light modulating material in proximity to two sides thereof;
positioning said second substrate in contact with said light modulating material in proximity to said first substrate; and
curing said gasket material.

11. A method of making an electrooptical display comprising the steps of:
providing a first substrate and a second substrate, a first layer of electrically conductive material disposed on said first substrate and a second layer of electrically conductive material disposed on said second substrate;
forming a bead of adhesive gasket material over said first substrate;
flowing light modulating material onto said first layer of electrically conductive material and over said bead;
positioning said second substrate in contact with said light modulating material in proximity to said first substrate;
curing said gasket material, and
cutting through one of said first substrate or said second substrate near an area of a ledge where one of said first substrate or said second substrate overhangs the other.

12. The method of claim 11 wherein said cutting occurs outside of said gasket material.

13. The method of claim 11 wherein said cutting occurs within said gasket material.

14. The method of claim 11 wherein said cutting occurs after said second substrate is put into said position.

15. The method of claim 1 said light modulating material including spacers that set a gap between said first electrically conductive layer and said second electrically conductive layer, comprising moving said first substrate and said second substrate together to compress said gasket until said first electrically conductive layer and said second electrically conductive layer contact said spacers.

16. A method of making liquid crystal displays comprising the steps of:
moving a sheet of a first substrate along a conveyor, said first substrate including a first layer of electrically conductive material formed thereon;
forming a plurality of spaced apart beads of adhesive gasket material over said first substrate so that each of said beads of said gasket material forms an area that is enclosed by said bead;
flowing liquid crystal material into each said area in contact with said first layer of electrically conductive material and over said gasket material;
moving a sheet of a second substrate in contact with said liquid crystal material in proximity to said first substrate, said second substrate including a second layer of electrically conductive material formed thereon;
said liquid crystal material including spacers that set a gap between said first electrically conductive layer and said second electrically conductive layer;
pressing at least one roller against at least one of said first substrate and said second substrate to move said first substrate and said second substrate together and to compress said gasket material of each of said beads until said first electrically conductive layer and said second electrically conductive layer contact said spacers;
curing said gasket material; and
cutting through said first substrate and said second substrate at non-ledge portions of a plurality of displays, and cutting through one of said first substrate or said second substrate, but not the other, near an area of each ledge of each of said displays.

17. A liquid crystal display comprising:
a first substrate and a second substrate that are spaced apart from each other;
a first layer of electrically conductive material disposed on said first substrate and a second layer of electrically conductive material disposed on said second substrate;
liquid crystal material disposed between said first substrate and said second substrate;
a perimeter gasket formed of adhesive gasket material disposed at a perimeter of said display and between said first substrate and said second substrate in contact with said first electrically conductive layer and said second electrically conductive layer, said perimeter gasket having one side in proximity to said liquid crystal material, said perimeter gasket sealing said liquid crystal material in said display; and
an inner gasket formed of adhesive gasket material located between said substrates such that two sides of said inner gasket are in proximity to said liquid crystal material.

18. The display of claim 17 wherein said first substrate and said second substrate are comprised of polymer, said first substrate and said first electrically conductive layer being transparent.

19. The display of claim 17 wherein said liquid crystal material comprises cholesteric liquid crystal material.

20. A method of making a liquid crystal display comprising the steps of:
- providing a first substrate, a first layer of electrically conductive material being disposed on said first substrate;
- forming a bead of adhesive gasket material over said first substrate to form an area that is enclosed by said gasket material;
- flowing liquid crystal material into said area in contact with said first layer of electrically conductive material and over said bead;
- providing a second substrate, a second layer of electrically conductive material being disposed on said second substrate;
- positioning said second substrate in contact with said light modulating material in proximity to said first substrate;
- curing said gasket material;
- cutting through said first substrate, said second substrate and said gasket material at non-ledge portions at a perimeter of said display;
- forming cuts through only one of said first substrate and said second substrate at each of ledge portions of said display, the other of said first substrate and said second substrate being uncut at each of the ledge portions of said display, said cuts being disposed in alignment with said gasket material or outside of said gasket material;
- wherein said cutting step and presence of said gasket material and said forming of said cuts prevent electrical shorts between said first layer of electrically conductive material and said second layer of electrically conductive material; and
- removing a cut portion of said cut one of said first substrate and said second substrate at each of said ledge portions.

21. A method of making a liquid crystal display comprising the steps of:
- providing a first substrate, a first layer of electrically conductive material being disposed on said first substrate;
- forming a bead of adhesive gasket material over said first substrate;
- flowing liquid crystal material in contact with said first layer of electrically conductive material and over said gasket material;
- providing a second substrate, a second layer of electrically conductive material being disposed on said second substrate;
- positioning said second substrate in contact with said light modulating material and in proximity with said first substrate;
- curing said gasket material;
- cutting through said first substrate and said second substrate at non-ledge portions at a perimeter of said display;
- forming cuts through only one of said first substrate and said second substrate at each of ledge portions of said display, the other of said first substrate and said second substrate being uncut at each of the ledge portions of said display, said cuts extending into said gasket material as a buffer to prevent cutting through the other of said first substrate and said second substrate; and
- removing a cut portion of one of said first substrate and said second substrate at each of said ledge portions.

22. The method of claim 21 comprising laser singulating or die cutting said display at said non-ledge portions of said display through said first substrate and said second substrate.

23. The method of claim 22 wherein said laser singulating takes place through said gasket material.

24. A liquid crystal display comprising:
- a first substrate and a second substrate that are spaced apart from each other;
- a first layer of electrically conductive material disposed on said first substrate and a second layer of electrically conductive material disposed on said second substrate;
- liquid crystal material disposed between said first substrate and said second substrate;
- a gasket formed of cured adhesive material disposed at a perimeter of said display and between said first substrate and said second substrate in contact with said first electrically conductive layer and said second electrically conductive layer, said gasket having one side in proximity to said liquid crystal material, said gasket sealing said liquid crystal material in said display;
- wherein said display includes at least one ledge extending from a location where one of said first substrate and said second substrate begins to overhang the other, said gasket being disposed internally of said location or said gasket being cut in alignment with said location.

25. The liquid crystal display of claim 24 wherein said gasket is present along said location where one of said first substrate and said second substrate begins to overhang the other, said gasket being cut in alignment with said location.

26. The liquid crystal display of claim 25 comprising a laser seal of said first and second polymer substrates at the rest of the perimeter of the display, which seals the liquid crystal material of the display.

27. The liquid crystal display of claim 24 wherein said adhesive material of said gasket forms a closed loop of a continuous bead that completely encloses said liquid crystal material between said first substrate and said second substrate.

* * * * *